Patented Oct. 29, 1935

2,018,681

UNITED STATES PATENT OFFICE 2,018,681

COMPOSITION FOR INSECTICIDAL OR FUNGICIDAL USE AND METHOD OF PREPARING THE SAME

John F. Littooy, San Francisco, and Frank Floyd Lindstaedt, Oakland, Calif., assignors to Hercules Glue Company, a corporation of California No Drawing. Application August 26, 1930, Serial No. 477,980

11 Claims. (Cl. 167—42)

Our invention relates to compositions for insecticidal, fungicidal or similar use; and it is the broad object of our invention to enhance the deposit of toxic substance on objects treated therewith.

Another object of our invention is the provision of a preparation for insecticidal or the like use, which may be employed in aqueous spray compositions to enhance, on objects sprayed, the deposit of the toxic substance dispersed or suspended in the liquid spray, or which may be used in dry form for dusting on objects and to enhance toxic deposit.

This is a continuation in part of the application of one of us filed June 7, 1928, Serial No. 283,738.

The invention possesses numerous other objects and features of advantage, some of which, with the foregoing, will be set forth in the following description of our invention. It is to be understood that we do not limit ourselves to this disclosure of species of our invention, as we may adopt variant embodiments thereof within the scope of the claims.

To prevent the damage or destruction of fruit and other vegetation by insects and parasites, toxic compositions, such as those comprising water and an insecticide and/or fungicide dispersed therein, are employed. Also such compositions may be employed for dusting purposes without dispersion in water. It is the practice to disperse or suspend in the aqueous spray composition, spreaders for the purpose of effecting a uniform coverage on the objects sprayed. It is obvious that, during the spraying or dusting, considerable quantity of toxic substance is lost due to its failure to take hold readily on the objects. This is caused, to a great extent, by reason of the fruit or other vegetation having a waxy or repellant surface which sheds the toxic substance.

The method and composition of our invention is designed to obviate the described difficulty, by enhancing the deposit of insecticide or fungicide, per unit area, on the objects sprayed or dusted. This makes it possible to use lesser quantities of the toxic substance, and still give as effective toxic deposit, than would be the case if the method and composition of our invention were not employed, thus effecting considerable economy.

In terms of broad inclusion, our invention comprises effecting a thorough mixture of the insecticide or fungicide with an unctuous material also termed an oleaginous material herein. In the case of an aqueous spray, this may be done either by thoroughly mixing a suitable quantity of toxic substance while dry with the unctuous material, and then dispersing a suitable quantity of such mixture in the water, together with a suitable spreader; or by thoroughly mixing the unctuous material with the spreader prior to dispersion in the spray liquid, to which the toxic substance may be added. In the case of dusting compositions the toxic substance may be mixed with the unctuous material in any suitable manner.

If desired, the unctuous material spreader and toxic substance may be added separately to the water in the spray tank, and the mixing effected when these materials are dispersed in the water according to usual practice. Also, the spreader, toxic substance, and unctuous material may be mixed together in powdered or substantially dry form prior to dispersion in the water.

For the purpose of illustrating one embodiment of the manner in which our invention may be performed, we choose an arsenical, such as powdered and substantially dry lead arsenate, and a spreader, such as powdered and substantially dry lime-casein mixture comprising about 80% by weight of hydrated lime and 20% by weight of casein. It has heretofore been the practice to disperse thoroughly about ½ to 1 lb. of the spreader and from 2 to 7 lbs. of lead arsenic in the spray water, per 100 gallons of water. The resultant composition is then sprayed on the fruit or other vegetation, while dispersed.

We have found that by thoroughly mixing an unctuous material, such as mineral oil, with either the powdered spreader or the powdered arsenical, or a mixture thereof to form a homogeneous mixture, the toxic deposit per unit area is enhanced when these ingredients are dispersed in the spray water and sprayed on the fruit or other vegetation while dispersed. Although the most satisfactory results are obtained by thoroughly mixing the substantially dry compound for insecticidal use with the unctuous material, satisfactory results may be obtained by adding the ingredients directly to the spray water and effecting thorough mixing in the water when the ingredients are dispersed therein in the usual manner.

For most purposes, we find that a quantity of unctuous material from ¼% to 10% by weight of the toxic substance suitable, whether thoroughly mixed with the toxic substance alone, with the spreader alone, with a mixture of spreader and toxic substance, or in the spray water. The exact quantity of unctuous material will depend, to a great extent on the surface character of the objects sprayed. For example, when spraying apples, relatively large quantities of unctuous material should be used, because of the extremely waxy surface of such fruit. In some instances, where the fruit or other vegetation to be sprayed is exceptionally waxy, as high as 20% of unctuous material by weight of toxic substance may be used.

It is thought that the toxic deposit is enhanced per unit area of object sprayed, due to the fact that the unctuous material is absorbed and/or adsorbed by the toxic substance, providing an oily film on the particles. This facilitates sticking of the toxic substance on the waxy surfaces of the fruit and other vegetation.

In place of an arsenical, such as lead arsenate as the insecticide, other toxic substances, which will adsorb and/or absorb or mix with the unctuous material may be employed with satisfactory results. Calcium arsenate, Paris green, Bordeaux mixture, suitable fluosilicates and nicotine may be used in the manner described. Also a fungicide, such as calcium monosulfide, may be employed. Other spreaders, besides the lime-casein mixture, may be used, such as powdered glue, blood albumen, and powdered rosin.

For the mineral oil any suitable unctuous material may be used instead, or in any suitable mixtures. For example, a suitable vegetable oil, such as cotton seed oil, or a suitable animal oil, such as fish oil, will act in a satisfactory manner. The unctuous material need not be a true oil, but may be a grease or fat, or any material containing greases, fats and/or oils. For instance whole rich milk, condensed milk, powdered milk, powdered skimmed milk, and soy bean meal may be mixed in the manners described.

Inasmuch as we have found that the unctuous material need not be a true oil or fat, but may be a substance containing natural oils, advantage of this is taken in the preparation of our preferred composition. One of the best types of spreaders is a lime-casein mixture in the proportions previously set forth. It has been discovered by us that if, in place of the casein, another protein relatively high in unctuous material content is employed, a composition having the property of a spreader and containing sufficient unctuous material to provide the results contemplated is produced.

An effective spreader composition comprises a thorough mixture of soy bean flour about 5% by weight, powdered skimmed milk about 15% by weight and hydrated lime about 80% by weight. It is obvious that the quantities of hydrated lime and protein may be varied in the mixture, as is well known to those skilled in the art, and that lime or any other suitable alkali may be used in place of hydrated lime. Also, additional unctuous material may be employed in the mixture, if so desired.

Instead of a mixture of soy bean flour and powdered skimmed milk, other proteins or protein carrying substances relatively high in unctuous material content may be used. The amounts of soy bean flour and powdered skimmed milk may be varied in proportions obvious to those skilled in the art.

The toxic substance may be thoroughly mixed with the preferred composition prior to dispersion of these substances in the spray water; or, if desired, the mixture of the unctuous spreader and toxic substance may be effected in the spray water, as previously explained.

We have found that ½ to 1 lb. of the preferred spreader composition and 2 to 7 lbs. of the toxic substance, dispersed in 100 gallons of spray water suitable for most purposes. However, the quantity of spreader and/or toxic substance may be varied according to well known practice, depending upon the character of fruit or other vegetation to be treated.

One of the interesting results which we have found, is that in the case where an insecticide or the like composition, such as lead arsenate or Bordeaux mixture, is employed, and the unctuous material is mixed with the insecticide or the like, the use of spreaders may not be necessary. This is so, since the unctuous material itself performs the function of increasing the toxic deposit per unit area, as well as aiding the toxic substance to be retained on the surface, for a longer period than would be the case if the unctuous material were not employed.

In the case of dusting materials, we have found that the unctuous material may be mixed in any suitable manner and in any suitable proportions with the toxic substance, or with any of the other substances going into the dusting composition. It is to be noted that in the compositions of our invention, the unctuous material is in relatively small quantities, thus acting for the purposes described, instead of as an insecticide or the like per se.

We claim:

1. A spreader for insecticidal or the like use comprising a thorough mixture of lime, soy bean flour, and skimmed powdered milk.

2. A spreader for insecticidal or the like use comprising a thorough mixture of hydrated lime about 80% by weight, and a protein relatively high in non-metallic oleaginous material content about 20% by weight.

3. A composition comprising a uniform and relatively dry mixture of a toxic substance for insecticidal or the like use and a non-metallic oleaginous material, said toxic substance constituting the major portion of said mixture, said oleaginous material being present in an amount insufficient to have any substantial efficiency as an insecticide per se, or to reduce the efficacy of said toxic substance.

4. A composition for insecticidal and like use comprising a toxic substance and a non-metallic oleaginous material mixed therewith and comprising from about ¼% to 20% by weight of said toxic substance.

5. A composition for insecticidal and like use comprising a toxic substance and a spreader mixed therewith, said spreader including an alkaline earth material, a protein, and a non-metallic oleaginous material as skim milk, said oleaginous material being present in an amount less than 20% of said toxic substance.

6. A composition for insecticidal and like use comprising a toxic substance, a spreader therefor, and a non-metallic oleaginous material present in an amount not exceeding 20% by weight of said toxic substance.

7. A spray composition comprising a fluid mixture including about 100 gallons of water, 2 to about 7 pounds of a toxic substance and a pound or less of a spreader, said spreader including a non-metallic oleaginous material in an amount less than 20% of the weight of the toxic substance.

8. The method of enhancing the deposit of a toxic substance sprayed on an object which comprises thoroughly dispersing in water said toxic substance and an oleaginous material, said material being present in an amount less than 20% of said substance by weight, and spraying the resultant composition while thus dispersed.

9. A spreader consisting essentially of a uniform and relatively dry powdered mixture of an alkaline earth material, a protein and a non-metallic oleaginous material.

10. A spreader consisting essentially of a uniform and relatively dry powdered mixture of an alkaline earth material, a protein, and powdered milk.

11. A spreader consisting essentially of a uniform and relatively dry powdered mixture of an alkaline earth material, powdered casein, and powdered milk.

JOHN F. LITTOOY.
FRANK FLOYD LINDSTAEDT.